M. NANNI.
AMUSEMENT DEVICE.
APPLICATION FILED AUG. 4, 1917.

1,262,377.

Patented Apr. 9, 1918.
3 SHEETS—SHEET 1.

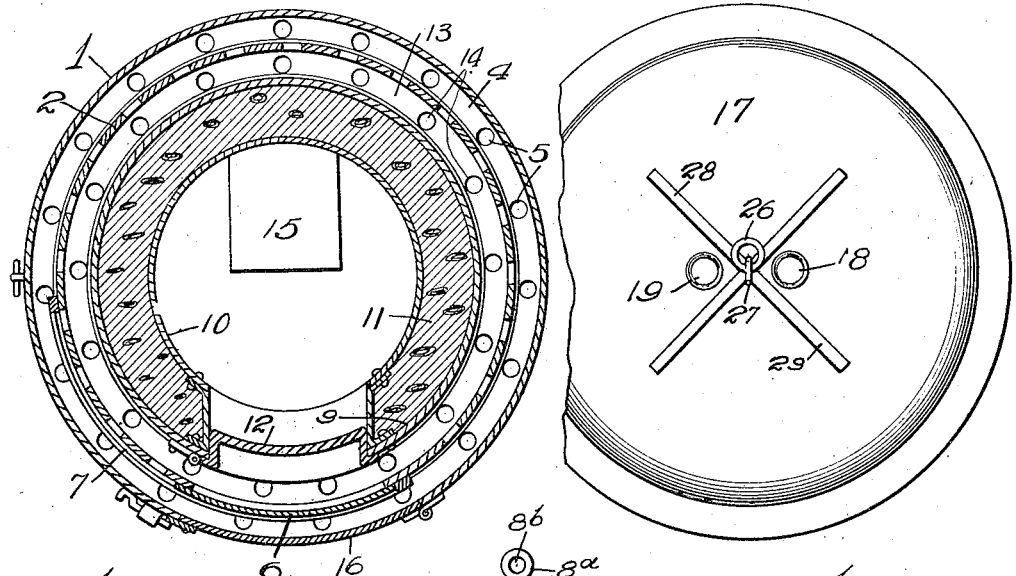
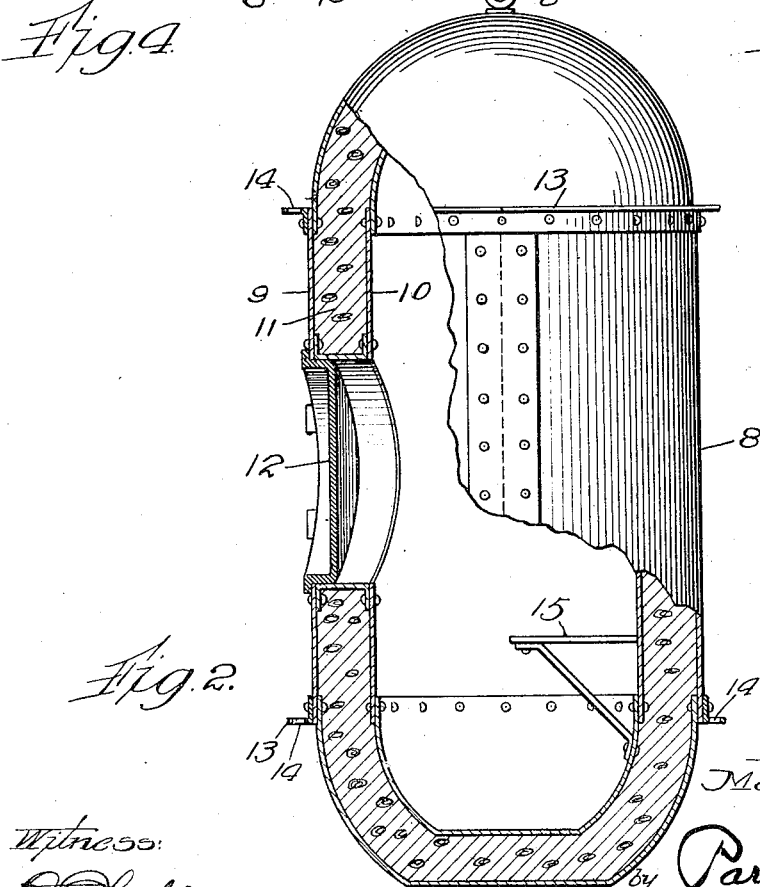

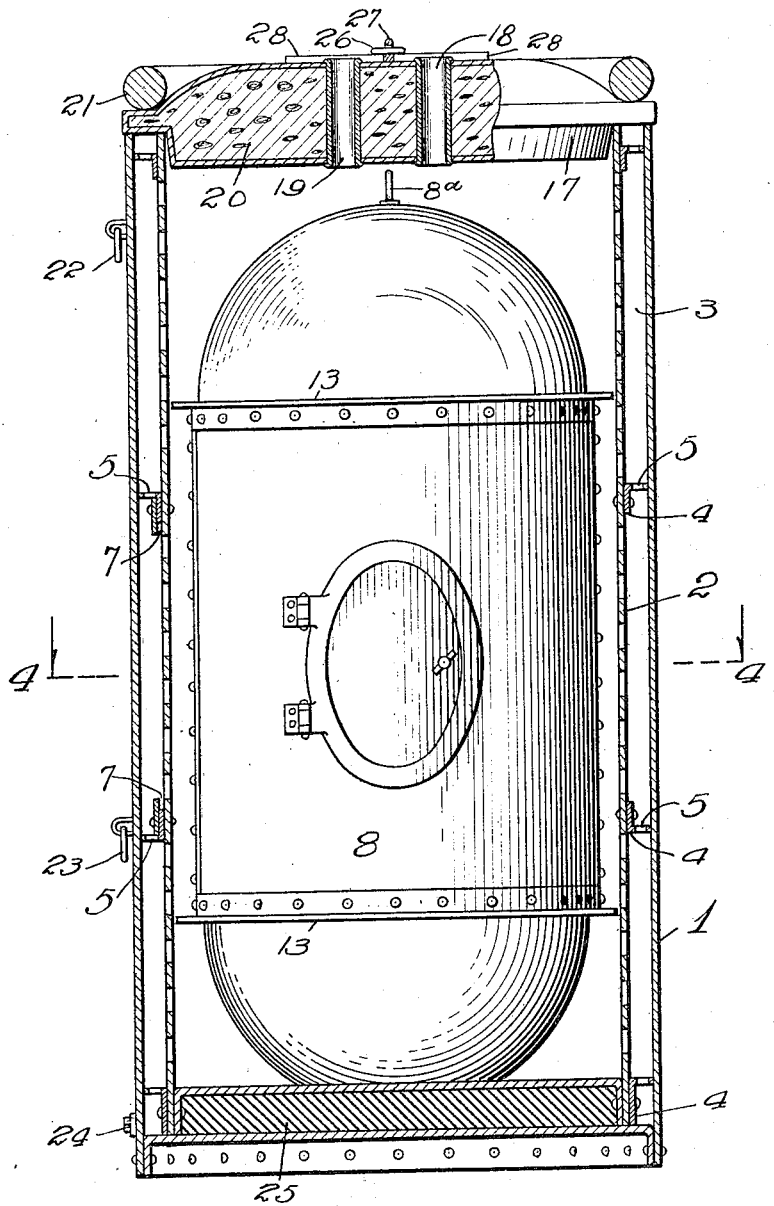

UNITED STATES PATENT OFFICE.

MENOTTI NANNI, OF CHICAGO, ILLINOIS, ASSIGNOR TO OCEAN FLOATING SAFE COMPANY, OF PIERRE, SOUTH DAKOTA, A CORPORATION OF SOUTH DAKOTA.

AMUSEMENT DEVICE.

1,262,377. Specification of Letters Patent. Patented Apr. 9, 1918.

Application filed August 4, 1917. Serial No. 184,435.

*To all whom it may concern:*

Be it known that I, MENOTTI NANNI, a subject of the King of Italy, residing at Chicago, in the county of Cook and State of Illinois, have invented a certain new and useful Improvement in Amusement Devices, of which the following is a specification.

This invention relates to an improvement in amusement devices, and has for its object to provide a new and improved device of this description, by means of which an individual may be inclosed in a receptacle, which receptacle is inclosed in a receiving device heavier than water which is then sunk in the water, the device being entirely independent of the control of the party in the receptacle, and being so arranged that after a predetermined time, the receptacle containing the individual automatically rises to the surface of the water.

The invention is illustrated in the accompanying drawings, wherein—

Fig. 2 is an enlarged view in part section of the receptacle for containing the individual who is to be sunk in the water.

Fig. 3 is an enlarged vertical sectional view through the entire device.

Fig. 4 is a sectional view taken on line 4—4 of Fig. 3.

Fig. 5 is a top view of the cover of the device shown in Fig. 3.

Like numerals refer to like parts throughout the several figures.

Figure 1:
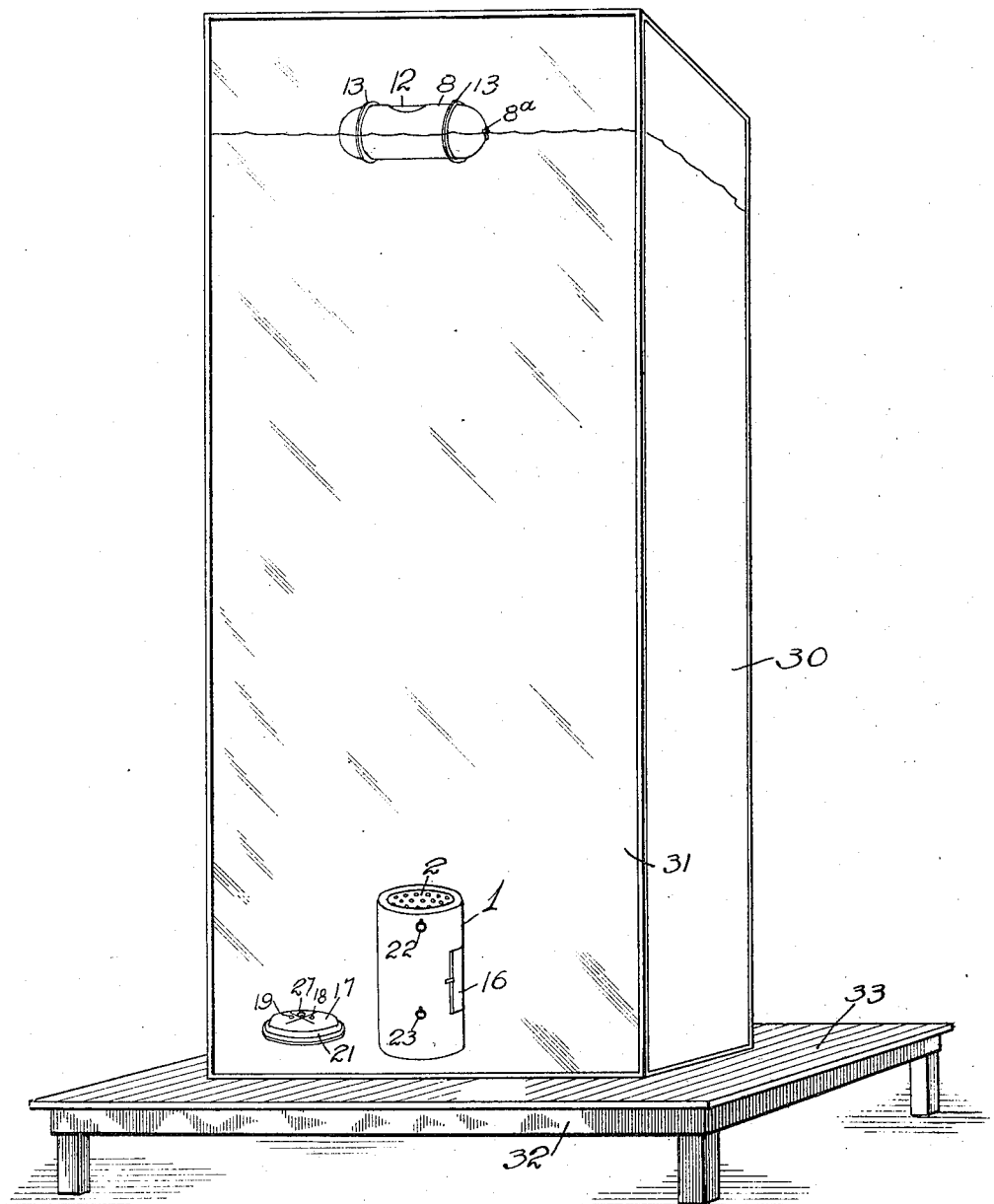
Figure 1 is a view of a tank containing water, showing the device sunk therein.

In carrying out my invention I provide an outer casing 1 which may be cylindrical and which is preferably made of metal so as to be heavier than the body of water displaced by it. This casing is preferably a non-leaking casing. Separate from the casing 1 and adapted to be contained in it is a second casing 2, which is arranged so as to permit water to enter its sides. There is a space 3 between the two casings 1 and 2. I prefer to provide guide pieces 4 for the casing 2 which keeps it centrally located within the casing 1. These guide pieces may be rings, and in that event, will be provided with holes 5 so that the water may freely pass by or through them. The casing 2 is preferably provided with a door 6 (see Fig. 4) which as illustrated, is a sliding door adapted to slide back into the slide-way 7. Located within the casing 2 is a receptacle 8. This receptacle is arranged so that it is buoyant, and when acted upon by the water, will rise to the surface. This receptacle may be made in any desired manner but is preferably arranged with two walls 9 and 10 preferably of metal, the space between them being filled with some buoyant material 11 such as cork. The receptacle is provided with a door 12 which, as shown, is a hinged door and which is located opposite the sliding door 6 in the casing 2 when the receptacle is in position in said casing. The receptacle is also preferably provided with guiding devices 13 which keep it centrally located within the casing 2 and these guiding devices are provided with openings 14 so that the water may freely pass by and through them.

I prefer to provide a seat 15 in the receptacle 8 for the individual who may be inclosed therein. The receptacle 8 may be provided with a supporting piece $8^a$ by means of which it may be easily handled by attaching a cable or the like thereto. This supporting piece is shown with a hole $8^b$ therein so that attachment of the supporting cable may be easily made. The outer casing 1 is also provided with the door 16 which is located opposite the doors 6 and 12 so that the individual may enter the receptacle 8 by passing through the doors in the two casings and through the door in the receptacle while the receptacle is in its proper position in the casings. A removable cover or lid 17 is provided which fits over the top of the casings 1 and 2 so as to close the upper ends of said casings. Some means is provided for permitting the water to gradually enter the casings 1 and 2. As herein shown the cover 17 is provided with openings 18 and 19 through which water may gradually enter and air gradually escape. In order to prevent anything that may fall on the cover from stopping the openings 18 and 19, I prefer to provide some upstanding part which will engage such device so as to hold it away from these openings such, for example, as the part 27 with which the holding device 26 is connected. I may also provide the upstanding ribs 28 and 29 for this same purpose. This cover may be made buoyant in any desired manner as by filling it with cork 20, or it may be made heavier than water. If I use a buoyant cover I may still make it heavier than water by means of a heavy weight 21 such as metal placed thereon, as shown in Fig. 3. When this cover is buoyant it may have a tight fit so as to keep it in place until pushed out by the receptacle 8, whereupon it will rise to the surface of the water. If it is heavier than the water, or the weight 21 is placed thereon, the cover will drop to the bottom when pushed out by the receptacle 8, as illustrated in Fig. 1. I prefer to provide the outer casing 1 with engaging devices by means of which a lifting device may be connected therewith. As herein shown, there are rings 22 and 23 connected to the outer casing at a distance from the door therein so that a suitable lifting device connected with a crane or the like may be attached thereto to move the device to any point desired and lift it into and out of the water. I also prefer to provide some means for securing the escape of water from the casing 1 when the device is lifted out of the water. As shown in Fig. 3 there is a plug 24 inside the casing which may be removed so as to let this water escape. I prefer to provide some means for making the lower end of the device heavy so that it will take an upright position and land on the bottom in this upright position. This result is secured by providing a weight 25 at the bottom. In the construction shown this weight is connected with the bottom of the casing 2. I also prefer to provide the cover with an engaging device 26 which, as shown, has a ring to which a lifting device may be attached to control the cover. The supporting piece 8ª on the receptacle 8 when the receptacle is lifted by the water in the tank, engages the cover and prevents the other parts of the receptacle from engaging the cover so as to stop up the hole 18 or 19 from the inside, thus insuring the water entering the casings. The device may be used in any body of water desired. For purposes of illustration I have shown a tank 30 which may be used in buildings where the exhibition is to be made. This tank is provided with a glass front 31 and it may also have glass sides. This tank, as shown in Fig. 1, is mounted upon a support 32 which has a free portion 33 at one side upon which the device may be mounted before the experiment is made.

I have described in detail a particular construction embodying the invention, but it is of course evident that the parts may be varied in many particulars without departing from the spirit of my invention as set out in the claims hereto attached.

The use and operation of my invention are as follows:

If the device is used in a tank as shown in Fig. 1 the casings and receptacle may be placed on the free portion 33 of the support 32 and may be shown to the audience separated, if desired, and may then be placed together as shown in Fig. 3. The party who is to make the descent may then be placed in the receptacle. He may enter the receptacle if desired through the doors 16, 6 and 12, all of the doors being shut and sealed so as to prevent the water from entering. The device may then be lifted by means of a lifting device connected to the parts 22 and 23 and may then be lowered in the water in the tank 30 and left on the bottom of the tank. The water then slowly enters the openings 17 and 18, the air passing out as the water enters. The water first enters the inner casing 2 and then passes through the openings therein into the outer casing 1 and when a sufficient amount of water enters the casings so as to cause the receptacle 8 to exert the proper lifting effect upon the cover, the cover will be lifted by the rising of the receptacle 8 and the receptacle 8 will then rise to the surface of the water, as shown in Fig. 1, whereupon it may be removed and the person who is inside may pass out through the door 12.

When the device is at the bottom of the water it can be easily seen by the audience and the bubbles of air that escape through the cover will pass up through the water, thereby holding their interest. The fact that there is an individual inside will also hold their interest, and the further fact that the individual has no control over the device will also be an important item in holding their interest. It will take a certain amount of time for the cover to be pushed off, and of course, the audience will be looking with interest and expectancy during all this time. This time may be controlled by the size of the openings 17 and 18 and the size of the casing and by the amount of water required to enter the casing to secure the proper lifting effect to lift the cover off of the casings.

I claim:

1. An amusement device comprising a buoyant receptacle into which an individual may be placed, a door for said receptacle for entrance into and exit therefrom, a casing into which said receptacle is received, a cover for said casing arranged so that the entire device may be submerged in water, means for gradually permitting water to enter the casing so as to cause the buoyant receptacle to rise in the casing and displace the cover and then be discharged from the casing, the buoyant receptacle rising to the surface of the water so that the individual therein may be removed.

2. An amusement device comprising a water-tight receptacle in which an individual may be placed, a casing containing said receptacle, the casing and receptacle adapted to be sunk together in water, and means out of the control of the individual in the receptacle for causing the receptacle to be ejected from the casing and to rise to the surface of the water.

3. An amusement device comprising an outer casing, an inner casing smaller in diameter than the outer casing and provided with a series of openings, a water-tight receptacle into which an individual is adapted to be placed and loosely contained within the inner casing, a cover for said casings, said casings, cover and receptacle adapted to be sunk together in water, and means independent of the individual in the receptacle for causing said cover to be opened and said receptacle to be ejected from said casings and to rise to the surface of the water.

4. An amusement device comprising an outer casing, an inner casing smaller in diameter than the outer casing provided with openings, a buoyant receptacle loosely contained within the inner casing and into which an individual may be placed, a cover for said casings, said casing, cover and receptacle adapted to be sunk together in water, and means for gradually admitting water into the casings so as to cause the buoyant receptacle to rise and lift the cover and then pass from the casing and to the surface of the water.

5. An amusement device comprising an outer casing, an inner casing smaller than the outer casing and provided with openings, means for holding the inner casing centrally in the outer casing, a buoyant receptacle smaller in size than said inner casing and loosely held therein, means for keeping the buoyant receptacle centrally located while in the casing, a cover for said casings and an opening in said cover for admitting water to the casings so as to cause the receptacle to rise therein and lift the cover and then pass out of the casing and rise to the surface of the water.

In testimony whereof, I affix my signature in the presence of two witnesses this 31st day of July, 1917.

MENOTTI NANNI.

Witnesses:
MARION L. INGRAHAM,
LYDIA M. SYLVANUS.

Copies of this patent may be obtained for five cents each, by addressing the "Commissioner of Patents, Washington, D. C."